(12) United States Patent
You et al.

(10) Patent No.: US 10,520,775 B2
(45) Date of Patent: Dec. 31, 2019

(54) LIQUID CRYSTAL DISPLAY PANEL, METHOD OF MAKING THE SAME, DISPLAY DEVICE INCLUDING LIQUID CRYSTAL DISPLAY PANEL

(71) Applicant: BOE TECHNOLOGY GROUP CO., LTD., Beijing (CN)

(72) Inventors: Jaegeon You, Beijing (CN); Xinxing Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/574,753

(22) PCT Filed: Mar. 22, 2017

(86) PCT No.: PCT/CN2017/077659
§ 371 (c)(1),
(2) Date: Nov. 16, 2017

(87) PCT Pub. No.: WO2018/049803
PCT Pub. Date: Mar. 22, 2018

(65) Prior Publication Data
US 2018/0292695 A1    Oct. 11, 2018

(30) Foreign Application Priority Data

Sep. 13, 2016  (CN) .......................... 2016 1 0822129

(51) Int. Cl.
*G02F 1/1339*  (2006.01)

(52) U.S. Cl.
CPC ............... *G02F 1/13394* (2013.01); *G02F 2001/13398* (2013.01)

(58) Field of Classification Search
None
See application file for complete search history.

(56) References Cited

U.S. PATENT DOCUMENTS

| 7,102,708 B2 | 9/2006 | Johgan et al. |
| 7,667,812 B2 | 2/2010 | Yanagisawa |
| 2010/0245699 A1* | 9/2010 | Gotoh ................ H01L 27/1288 349/46 |

(Continued)

FOREIGN PATENT DOCUMENTS

| CN | 1475816 A | 2/2004 |
| CN | 101310215 A | 11/2008 |

(Continued)

OTHER PUBLICATIONS

Office Action dated Aug. 17, 2018, issued in counterpart Chinese Application No. 201610822129.X. (8 pages).

(Continued)

*Primary Examiner* — Richard H Kim
(74) *Attorney, Agent, or Firm* — Westerman, Hattori, Daniels & Adrian, LLP

(57) ABSTRACT

The present disclosure relates to a liquid crystal display panel and a display device. The liquid crystal display panel includes a first substrate, a second substrate opposite to the first substrate, and a plurality of rectangular pixel inlays including at least two main photo spacers, the plurality of rectangular pixel arrays being disposed between the first substrate and the second substrate.

18 Claims, 5 Drawing Sheets

(56) References Cited

U.S. PATENT DOCUMENTS

| | | | |
|---|---|---|---|
| 2013/0250195 A1 | 9/2013 | Koito et al. | |
| 2013/0342782 A1* | 12/2013 | Kim | G02F 1/13394 349/46 |
| 2015/0293279 A1* | 10/2015 | Pei | G02B 5/201 359/891 |
| 2015/0370116 A1* | 12/2015 | Chae | G02F 1/13394 349/43 |
| 2016/0349575 A1* | 12/2016 | Li | G02F 1/133784 |

FOREIGN PATENT DOCUMENTS

| | | |
|---|---|---|
| CN | 103323980 A | 9/2013 |
| CN | 104516158 A | 4/2015 |
| CN | 105807484 A | 7/2016 |
| CN | 105807508 A | 7/2016 |
| JP | 2008164938 A | 7/2008 |

OTHER PUBLICATIONS

International Search Report dated Jun. 28, 2017, issued in counterpart International Application No. PCT/CN2017/077659 (12 pages).
Office Action dated Feb. 25, 2019, issued in counterpart CN Application No. 201610822129.X, with English translation (16 pages).
Office Action dated Jul. 15, 2019, issued in counterpart CN application No. 201610822129.X, with English translation. (10 pages).

* cited by examiner

LIQUID CRYSTAL DISPLAY PANEL, METHOD OF MAKING THE SAME, DISPLAY DEVICE INCLUDING LIQUID CRYSTAL DISPLAY PANEL

CROSS-REFERENCE TO RELATED APPLICATIONS

This application claims the benefit of the filing date of Chinese Patent Application No. 201610822129.X filed on Sep. 13, 2016, the entire disclosure of which is hereby incorporated by reference.

TECHNICAL FIELD

The present disclosure relates to a display technology, and more particularly to a liquid crystal display panel and a display device.

BACKGROUND

Flat panel display apparatuses have become an indispensable tool in the development of multimedia technology. Among the most versatile and commonly used flat displays are liquid crystal display (LCD) devices. Conventional LCD panels are mainly composed of a color film substrate, an array substrate, a liquid crystal layer disposed between the color film substrate and the array substrate, and a plurality of main photo spacers serving as a support. However, a problem using LCD devices is the "mura" or clouding defect, in which the brightness of the display screen appears inconsistent, and the colors as displayed on the display screen appear non-uniform or uneven to a viewer. The present inventors worked to provide a liquid crystal display panel and a display device that improve on conventional liquid crystal display technologies, including addressing the technical problems described above with respect to non-uniform colors on a display.

BRIEF SUMMARY

One embodiment of the present disclosure is a liquid crystal display panel. The liquid crystal display panel may comprise: a first substrate, a second substrate opposite to the first substrate, and a plurality of rectangular pixel arrays disposed between the first substrate and the second substrate. Each rectangular pixel array may comprise a plurality of pixels arranged in rows, and a plurality of main photo spacers. The plurality of main photo spacers may comprise at least one first main photo spacer distributed in a first row of pixels, and at least one second main photo spacer distributed in a second row of pixels. The at least one second main photo spacer may be positioned in the second row of pixels so as to be staggered with respect to the at least one first main photo spacer in the first row of pixels.

The liquid crystal display panel may comprise a plurality of the first main photo spacers which may be arranged at equal intervals in the first row of pixels. The liquid crystal display panel may also comprise a plurality of the second main photo spacers which may be arranged at equal intervals in the second row of pixels. The arrangement of the first main photo spacers and the arrangement of the second main photo spacers may be staggered with respect to each other.

The at least one first main photo spacer and the at least one second main photo may be positioned along a diagonal line extending from one corner of the rectangular pixel array to an opposite corner of the rectangular pixel array.

The first main photo spacer and the second main photo spacer may be located in inter-pixel gaps in the corresponding row of pixels.

At least one of the plurality of main photo spacers may be located adjacent to at least two pixels of the same color.

At least one of the plurality of main photo spacers may be located adjacent to at least two blue pixels.

At least a portion of the plurality of main photo spacers may be in contact with one of the first and second substrates. A total area of contact between the main photo spacers and the one of the first and second substrates may be within a range of from approximately 70 $\mu m^2$ to approximately 140 $\mu m^2$ per square millimeter ($mm^2$) of the liquid crystal display panel.

In at least some embodiments of the present disclosure, pixels in a same row in a rectangular pixel array have the same color, and each row of pixels is adjacent to a row of pixels having a different color.

The arrangements of the at least one first main photo spacer and the at least one second main photo spacer in adjacent rectangular pixel arrays may be the same. The arrangements of the at least one first main photo spacer and the at least one second main photo spacer in adjacent rectangular pixel arrays may also be different.

In at least some embodiments of the present disclosure, a rectangular pixel array may have may have a width of 10 pixels, and two main photo spacers may be provided in each rectangular pixel array. In other embodiments of the present disclosure, a rectangular pixel array may also have a width of 12 pixels, and three main photo spacers may be provided in each rectangular pixel array. In still other embodiments of the present disclosure, a rectangular pixel array may also have a width of 16 pixels, and four main photo spacers may be provided in each rectangular pixel array.

In at least some embodiments of the present disclosure, at least a portion of the plurality of main photo spacers may be in contact with one of the first and second substrates. At least one end of each main photo spacer contacting the one of the first and second substrate may comprise a contact surface that is one of circular, elliptical, and rectangular. In embodiments of the present disclosure where the contact surface is circular or elliptical, a diameter of the contact surface may be from approximately 8 $\mu m$ to approximately 20 $\mu m$. In embodiments of the present disclosure where the contact surface is rectangular, a length of each side of the rectangle may be from approximately 8 $\mu m$ to approximately 20 $\mu m$. Another embodiment of the present disclosure is a display device. The display device may comprise a liquid crystal display panel according to the present disclosure.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Next, the embodiments of the present disclosure will be described clearly and completely in conjunction with the accompanying drawings, which are described briefly above. The subject matter of the present disclosure is described with specificity to meet statutory requirements. However, the description itself is not intended to limit the scope of this disclosure. Rather, the inventors have contemplated that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Figure 1:
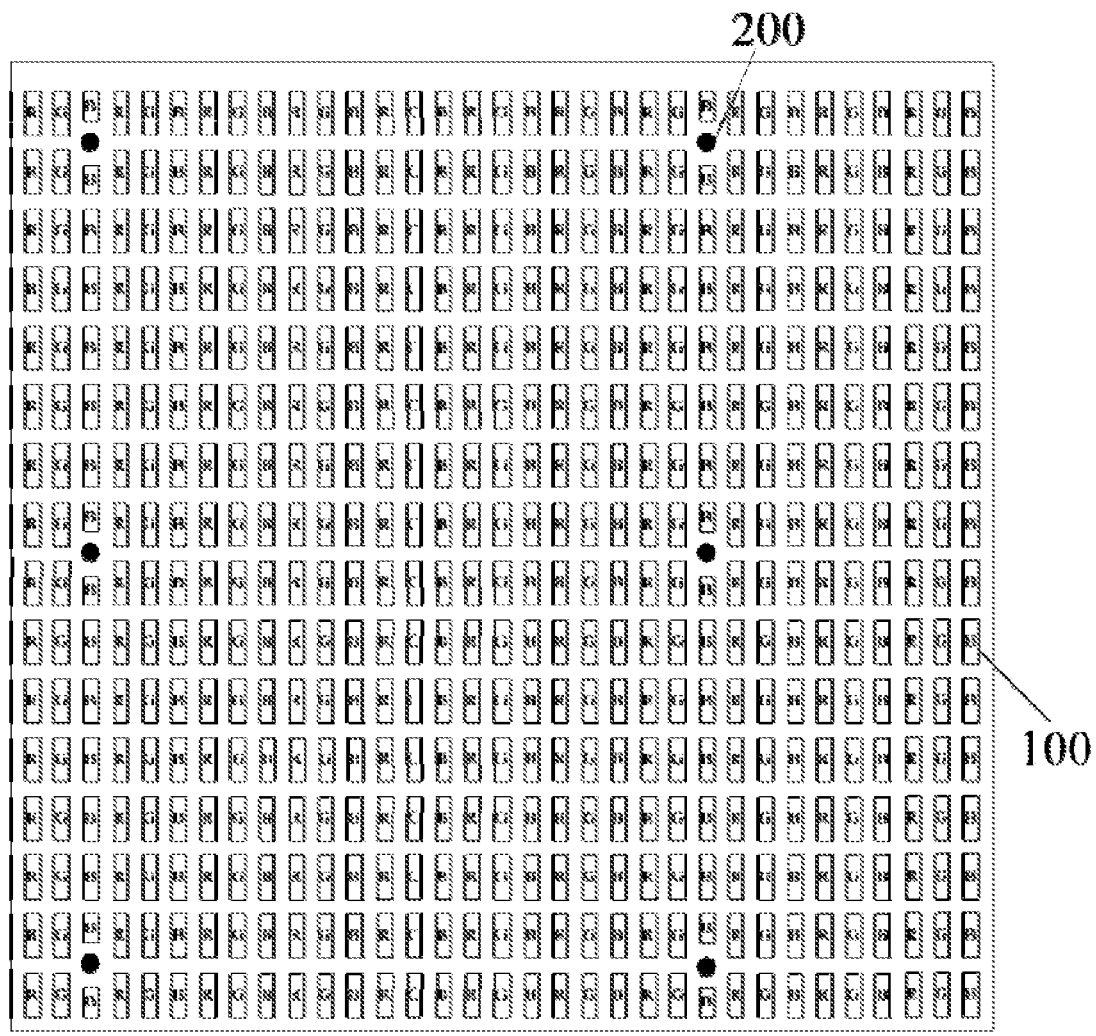
FIG. 1 shows a schematic diagram of the arrangement of main photo spacers in prior art liquid crystal display panel.

As shown in FIG. 1, in conventional liquid crystal display (LCD) panels, three pixels 100 of colors red (R), green (G), and blue (B) are arranged in rows. This arrangement is common in large-sized display panels. Further, as shown in FIG. 1, each of the main photo spacers 200 is located between two blue (B) pixels 100, and the main photo spacers 200 are aligned vertically and horizontally. To withstand external pressure, conventional LCD display panels arrange two main photo spacers 200 at intervals of 7 pixels. The pixels are arranged in repeating arrays, so that in conventional LCD panels, each inlay has a width of 7 pixels, and each array is provided with one main photo spacer 200.

When a LCD panel is subject to large external force (for example, >40 Kgf/cm$^2$), there is a risk that the main photo spacers 200 may dislodge, causing damages and scratches to an alignment layer that is in contact with the liquid crystal layer. This can cause a shift in the pre-tilt angle of the liquid crystal molecules and create non-uniformity in the liquid crystal layer, which in turn, produces non-uniformity in the colors of the display and therefore, a defective LCD product. Conventionally, the appearance of non-uniform colors is alleviated by shielding a larger area at the location of the main photo spacer 200 with a black matrix. However, since the main photo spacer 200 is located between two pixels (for example, between two blue (B) pixels 100), an increase in the amount of black matrix at the location of the main photo spacer 200 will inevitably decrease the aperture ratio. This can also result in the undesirable appearance of non-uniform colors on display screens (for example, non-uniform blue colors when the main photo spacer 200 is provided between two blue (B) pixels 100), that is, the "mura" or clouding defects.

A LCD panel according to the present disclosure improves on the conventional LCD panels, including the technological problem described above of the perceived appearance of non-uniform a colors on a display.

Figure 2:
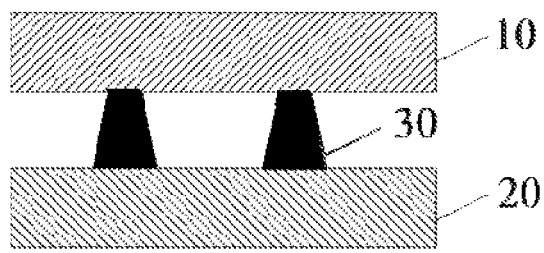
FIG. 2 shows a schematic diagram of a liquid crystal display panel according to an embodiment of the present disclosure.

As shown in FIG. 2, an LCD panel according to an embodiment of the present disclosure includes a first substrate 10, a second substrate 20 provided opposite to the first substrate, and main photo spacers 30 disposed between the first and second substrates 10, 20.

The main photo spacers 30 are disposed in the pixel arrays. Optionally, the main photo spacers 30 are disposed in an inter-pixel gap between two pixels. The amount of contact between the main photo spacers 30 and the first substrate or the second substrate is controlled, for example, in order to withstand certain external pressures. For example, the main photo spacers 30 are distributed in a manner so that a total area of contact between the main photo spacers and one of the first and second substrates is from approximately 70 to approximately 140 μm$^2$ per square millimeter (mm$^2$) of the LCD panel.

A plurality of pixels arranged in arrays are provided in a display area between the first and second substrates 10, 20. Optionally, pixels are arranged into a plurality of rectangular pixel arrays. The rectangular pixel arrays are arranged consecutively. Optionally, at least two main photo spacers 30 are disposed within a rectangular pixel array. The main photo spacers 30 within a rectangular pixel array do not overlap, and may be disposed in different rows and different columns relative to each other.

The rectangular pixel arrays should be arranged closely to each other. Optionally, the rectangular pixel arrays are arranged immediately adjacent to each other, so that no gaps are formed between rectangular pixel arrays.

To form the LCD panel according to the present disclosure, the main photo spacers 30 are disposed on a side of the first substrate 10 facing the second substrate 20, so that a free end of each main photo spacer 30 provides a contact surface for contacting the second substrate 20. The main photo spacers 30 may also be disposed on a side of the second substrate 20 facing the first substrate 10, so that a free end of each main photo spacer 30 provides a contact surface for contacting the first substrate 10.

A shape of the contact surface on the main photo spacer 30 is not particularly limited. The shape of the contact surface may be circular, elliptical, rectangular, or polygonal.

When the shape of the contact surface on the main photo spacer 30 is circular or elliptical, the maximum diameter of the circle or ellipse may be in a range of from approximately 8 μm to approximately 20 μm. When the shape of the contact surface on the main photo spacer 30 is rectangular, the maximum length of a side of the rectangle may be in a range of from approximately 8 μm to approximately 20 μm. The range of the sizes for the contact surface is selected so as to facilitate calculations of the number of main photo spacers 30 required to satisfy the desired contact area, as well as calculations of the total number of main photo spacers 30 based on a given size of the LCD panel.

Since the contact area between the main photo spacers and the substrates is fixed, the total number of main photo spacers may also be fixed. The larger the area of a rectangular pixel array, the larger the number of main photo spacers 30 provided in the rectangular pixel array. Optionally, the size of adjacent rectangular pixel arrays stays the same, in which case, in accordance with the contact area, the number of main photo spacers 30 provided in each rectangular pixel array also stays the same. In other embodiments, adjacent rectangular pixel arrays may be of different sizes, in which case, the number of main photo spacers 30 provided in each rectangular pixel array is also different.

As an example, when a rectangular pixel array has a width of 10 pixels, two (2) main photo spacers are provided in the rectangular pixel array. As another example, when a rectangular pixel array has a width of 12 pixels, three (3) main photo spacers are provided in the rectangular pixel array. As another example, when a rectangular pixel array has a width of 16 pixels, four (4) main photo spacers are provided in the rectangular pixel array. The number of main photo spacers disposed in a rectangular pixel array changes proportionally with the size of the rectangular pixel array.

The visual contrast sensitivity of a human eye to light may be determined according to the following contrast-based formulae (1) and (2):

Number of grating periods per degree of view=1/
{57.3 atan(length of grating period/viewing distance) (1)

Contrast ratio=$(I_{max}-I_{min})/(I_{max}+I_{min})$ (2)

where $I_{max}$ refers to maximum intensity, and $I_{min}$ refers to minimum intensity.

More particularly, increasing the number of grating periods per degree of view and decreasing the contrast ratio can reduce a human eye's sensitivity to visual contrasts. This can minimize perception of non-uniform colors on a display screen.

Figure 3A:
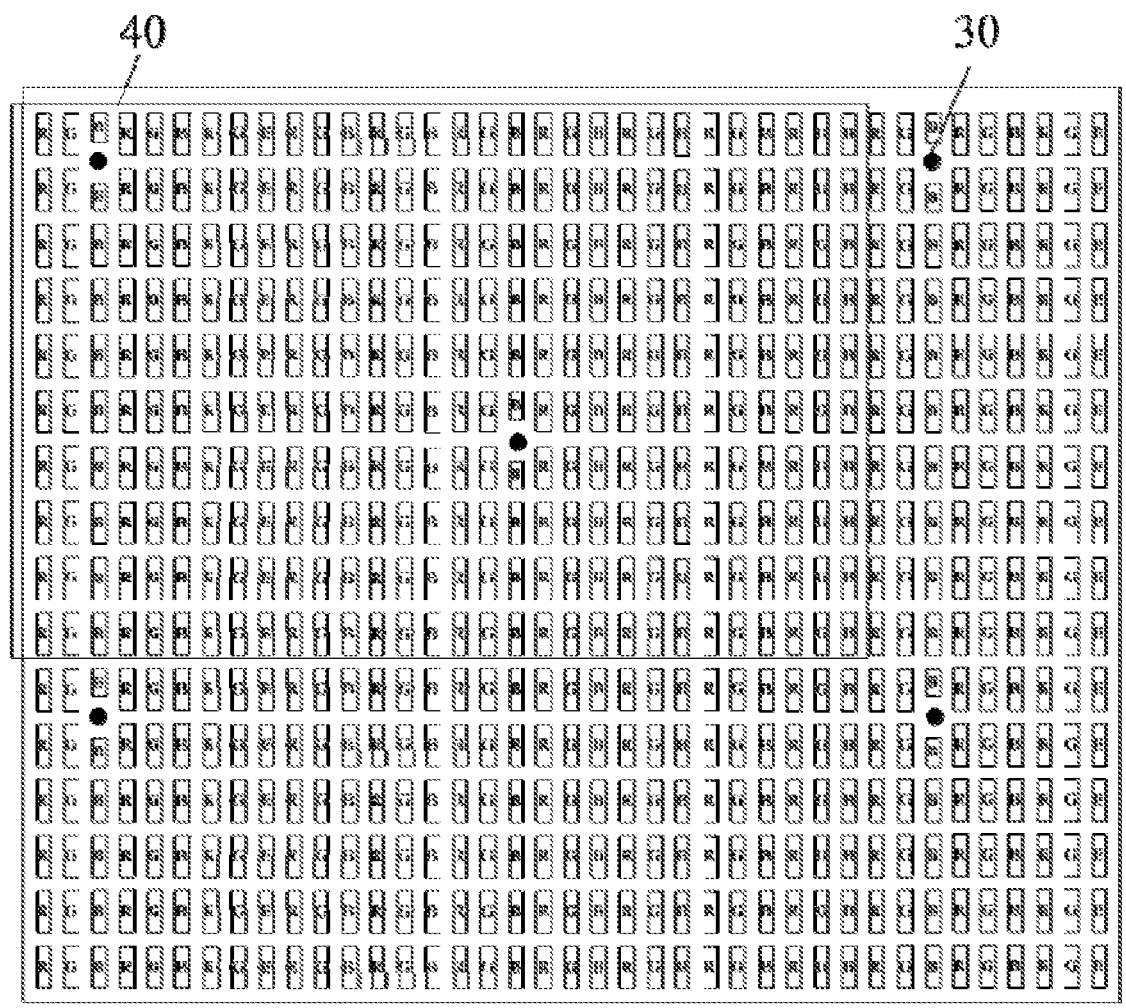
FIGS. 3a to 3c show schematic diagrams of arrangements of main photo spacers in a liquid crystal display panel according to the present disclosure.
Figure 3B:
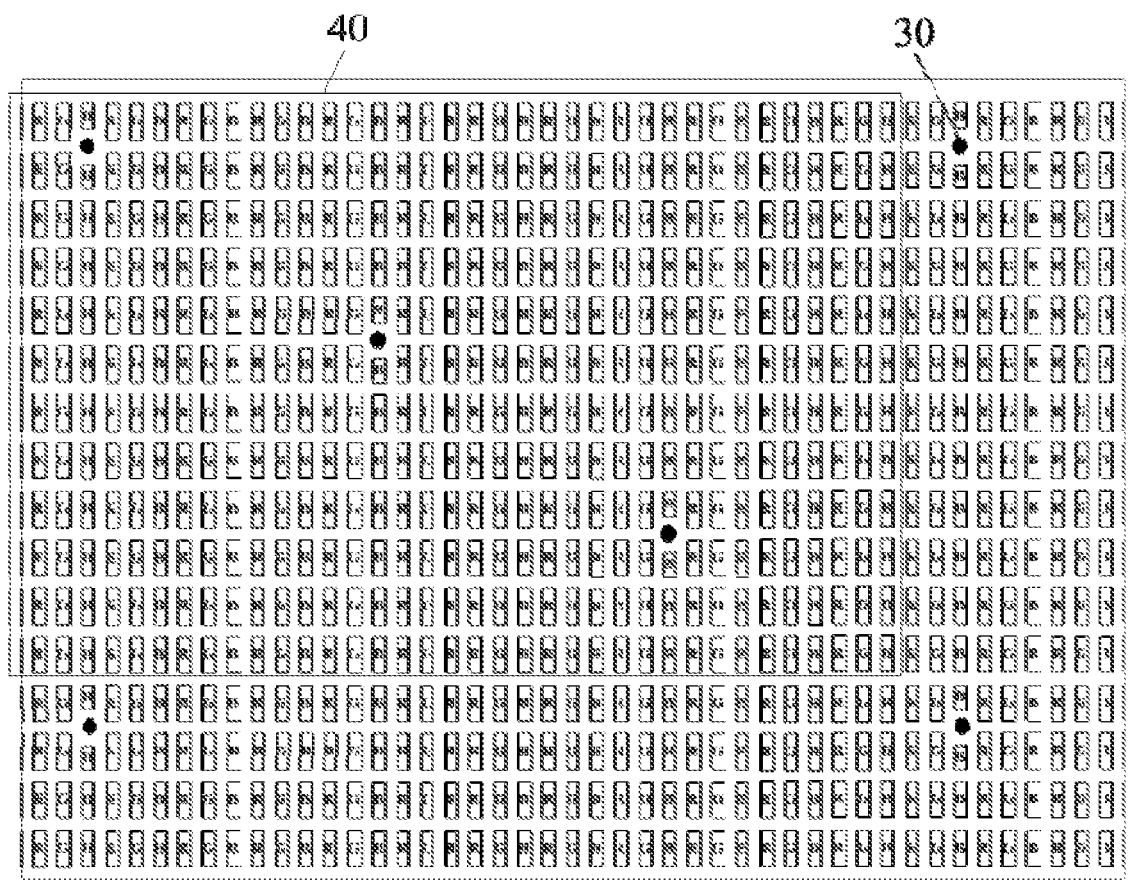
Figure 3C:
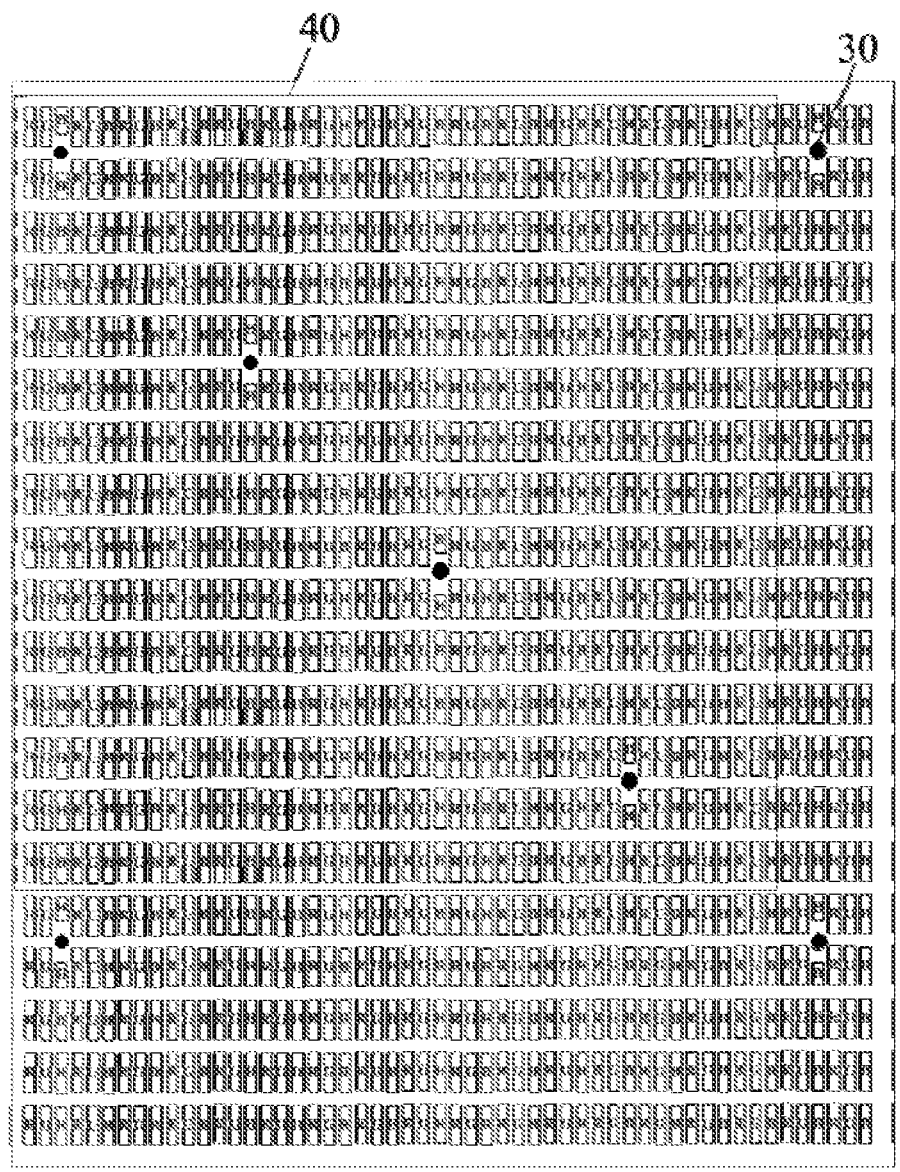
Figure 4:
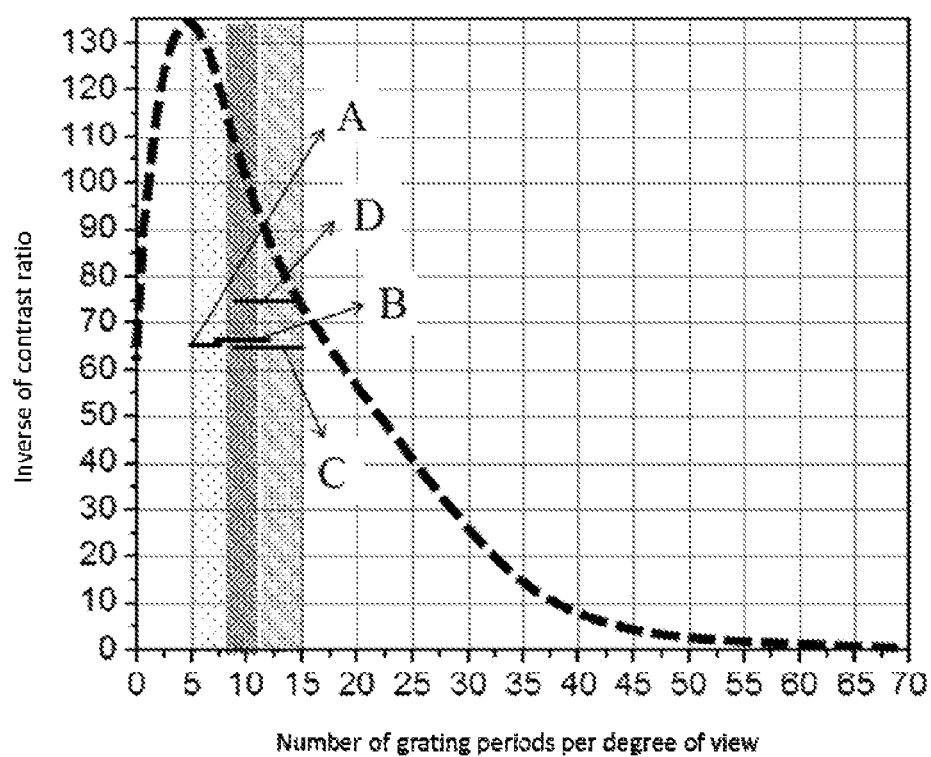
FIG. 4 is a graph showing the results of a human eye visual contrast sensitivity test conducted using a liquid crystal display panel according to the present disclosure.

FIGS. 3a to 3c illustrate embodiments of the LCD panel according to the present disclosure. FIG. 4 shows the visual contrast sensitivity for various embodiments of an LCD panel, as calculated according to formulae (1) and (2) above. In FIG. 4, the x-axis represents the number of grating periods per degree of view, and the y-axis represents the inverse of the contrast ratio. Arrangement A represents a 7×7 arrangement according to the prior art. Arrangement B represents a 10×10 arrangement of main photo spacers 30 according to an embodiment of the LCD panel of the present disclosure. Arrangement C represents a 12×12 arrangement of main photo spacers 30 according to another embodiment of the LCD panel of the present disclosure. Arrangement D represents a 16×16 arrangement of main photo spacers 30 according to another embodiment of the LCD panel of the present disclosure. The black dotted line represents the human eye visual contrast sensitivity curve. When a value is below the dotted line, the human eye can perceive the object. When a value is above the dotted line, the human eye cannot perceive the object.

As shown in FIG. 4, as the length of the rectangular pixel array 40 increases, the number of grating periods per degree of view also increases. The number of grating periods per degree of view in arrangements A to D is 5-8, 7-12, 8-15, and 8-15, respectively. With each increase in the number of grating periods per degree of view, the visual contrast sensitivity approaches closer to the curve. As for the value corresponding to the inverse of the contrast ratio, arrangements A, B, and C exhibit similar contrast ratio. By comparison, the contrast ratio of arrangement D is significantly higher at 75, and is the closest to the curve. Accordingly, in the arrangement of main photo spacers 30 in a LCD panel according to the present disclosure, as the rectangular pixel array 40 increases in size, the number of main photo spacers 30 in the rectangular pixel array 40 also increases, and the arrangement of main photo spacers 30 become perceptibly more irregular and disordered. As a result, the number of grating periods per degree of view and the value of the inverse of contrast ratio shifts closer to the visual contrast sensitivity curve, suggesting that the ability of a viewer to perceive non-uniform colors is also reduced. In other words, the viewer's perceived occurrence of non-uniform colors is reduced, or even eliminated.

In an LCD panel according to the present disclosure, the main photo spacers 30 may be distributed based on the visual contrast sensitivity of the human eye to light. Without being limited to any particular theories, it is believed that the more uniformly the main photo spacers 30 are distributed, the more sensitive the human eye may be to color contrast on a display, and therefore, the more sensitive the human eye may become to regions of non-uniform colors on the display. Conversely, it is believed that the more non-uniform the distribution of the main photo spacers 30 is, the less sensitive the human eye may be to color contrasts on the display, and therefore, the lower the ability of the human eye may be in perceiving regions of non-uniform colors on the display.

Therefore, in an LCD panel according to the present disclosure, the arrangement of the main photo spacers 30 in the LCD panel is made to be as irregular as possible, in order to alleviate or even eliminate the perceived appearance of non-uniform colors on a display. Accordingly, in an LCD panel according to the present disclosure, at least two main photo spacers 30 are provided in each rectangular pixel array 40, and the main photo spacers 30 may be arranged in different rows and different columns of the rectangular pixel array 40.

Main photo spacers 30 in the same row of the rectangular pixel array 40 may be spaced at equal intervals from each other along a width of the rectangular pixel array 40. Embodiments where the main photo spacers 30 in the same row are spaced at irregular intervals are also possible. In some embodiments of the present disclosure, as shown in FIGS. 3a to 3c, the main photo spacers 30 within a rectangular pixel array 40 are arranged in a staggered arrangement, so that the positions of main photo spacers 30 in different rows of the rectangular pixel array are staggered with respect to each other. Optionally, the main photo spacers 30 are arranged on a diagonal line, which may extend from one corner of the rectangular pixel array to the opposite corner of the rectangular pixel array.

To further increase irregularity in the arrangements of the main photo spacers 30 in the LCD panel, the arrangements of main photo spacers 30 in adjacent rectangular pixel arrays 40 may be different. The position of each main photo spacer 30 in a rectangular pixel array 40 may be different from the positions of the main photo spacers 30 in an adjacent rectangular pixel array 40. As an example, main photo spacers 30 in two adjacent rectangular pixel arrays 40 may be arranged diagonally in different directions. As another example, the main photo spacers 30 in a rectangular pixel array 40 may be arranged in a triangle, and the main photo spacers 30 in an adjacent rectangular pixel array 40 may be arranged on a diagonal line.

Pixels in the same row may have the same color. Further, each row of pixels may be adjacent to a row of pixels having a different color. In the embodiment as illustrated in FIGS. 3a to 3c, the three colored pixels R, B, and G are arranged in alternate rows. Each main photo spacer 30 may be arranged adjacent to pixels of the same color, for example, adjacent to the red pixels, adjacent to the green pixels, or adjacent to the blue pixels. Optionally, each main photo spacer 30 is adjacent to at least two pixels of the same color.

Since the human eye is believed to be the least sensitive to the blue color, the main photo spacers 30 may be disposed adjacent to blue pixels. Optionally, each main photo spacer is adjacent to at least two blue pixels.

The main photo spacers 30 in each rectangular pixel array may be located in inter-pixel gaps between pixels. This may be advantageous in cases where the LCD panel needs to be of a large size. The main photo spacers 30 may be located in inter-pixel gaps in different rows and different columns of a rectangular pixel array. The main photo spacers 30 may be located in inter-pixel gaps along a diagonal line. Optionally, the main photo spacers 30 are located in inter-pixel gaps between pixels of the same color. Optionally, the main photo spacers 30 are located in inter-pixel gaps between two blue pixels. The arrangements as described allow the undesirable "mura" effects to be alleviated as much as possible.

In another aspect, the present disclosure also provides a display device comprising an LCD panel described above. The display device may be a mobile phone, a tablet computer, a television, a display, a notebook computer, a digital photo frame, navigator, and any other display products or components. The implementation of the display device can be seen in the embodiments of the LCD panel described above.

The sensitivity of human eyes to a pattern is believed to decrease with increasing disorder in the pattern. By increasing the irregularity in the arrangement of the main photo spacers, for example, by altering the distributions of the main photo spacers in closely adjacent pixel arrays, embodiments of the present disclosure can beneficially reduce the sensitivity of a human eye to color non-uniformity on a display, and in turn, reduce the perceived occurrence of undesirable "mura" or clouding defects.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A liquid crystal display panel, comprising:
   a first substrate,
   a second substrate opposite to the first substrate, and
   a plurality of rectangular pixel arrays between the first substrate and the second substrate,
   wherein each rectangular pixel array comprises: a plurality of pixels arranged in rows, and a plurality of main photo spacers,
   wherein the main photo spacers within a rectangular pixel array are arranged in a staggered arrangement, so that positions of the main photo spacers in different rows of the rectangular pixel array are staggered with respect to each other; and
   all the main photo spacers within the rectangular pixel array except those at four vertexes of the rectangular pixel array are two or more arranged on a diagonal line extending from one corner of the rectangular pixel array to an opposite corner of the rectangular pixel array.

2. The liquid crystal display panel according to claim 1, comprising a plurality of the first main photo spacers which are arranged at equal intervals in the first row of pixels, and a plurality of the second main photo spacers which are arranged at equal intervals in the second row of pixels, wherein the arrangement of the first main photo spacers and the arrangement of the second main photo spacers are staggered with respect to each other.

3. The liquid crystal display panel according to claim 1, wherein the main photo spacers are located in inter-pixel gaps in the corresponding row of pixels.

4. The liquid crystal display panel according to claim 1, wherein at least one of the plurality of main photo spacers is located adjacent to at least two pixels of the same color.

5. The liquid crystal display panel according to claim 1, wherein at least one of the plurality of main photo spacers is located adjacent to at least two blue pixels.

6. The liquid crystal display panel according to claim 1, wherein at least a portion of the plurality of main photo spacers are in contact with one of the first and second substrates, and a total area of contact between the main photo spacers and the one of the first and second substrates is within a range of from approximately 70 $\mu m^2$ to approximately 140 $\mu m^2$ per square millimeter ($mm^2$) of the liquid crystal display panel.

7. The liquid crystal display panel according to claim 1, wherein in each rectangular pixel array, pixels in a same row have the same color, and each row of pixels is adjacent to a row of pixels having a different color.

8. The liquid crystal display panel according to claim 1, wherein arrangements of the main photo spacers in adjacent rectangular pixel arrays are the same.

9. The liquid crystal display panel according to claim 1, wherein arrangements of the main photo spacers in adjacent rectangular pixel arrays are different.

10. The liquid crystal display panel according to claim 1, wherein each rectangular pixel array has a width of 10 pixels, and two main photo spacers are provided in each rectangular pixel array.

11. The liquid crystal display panel according to claim 1, wherein each rectangular pixel array has a width of 12 pixels, and three main photo spacers are provided in each rectangular pixel array.

12. The liquid crystal display panel according to claim 1, wherein each rectangular pixel array has a width of 16 pixels, and four main photo spacers are provided in each rectangular pixel array.

13. The liquid crystal display panel according to claim 1,
   wherein at least a portion of the plurality of main photo spacers are in contact with one of the first and second substrates, and
   at least one end of each main photo spacer contacting the one of the first and second substrate comprises a contact surface that is one of circular, elliptical, and rectangular.

14. The liquid crystal display panel according to claim 13,
   wherein the contact surface is circular or elliptical, and a diameter of the contact surface is from approximately 8 $\mu m$ to approximately 20 $\mu m$.

15. The liquid crystal display panel according to claim 13,
   wherein the contact surface is rectangular, and a length of each side of the rectangle is from approximately 8 $\mu m$ to approximately 20 $\mu m$.

16. A display device comprising the liquid crystal display panel according to claim 1.

17. The liquid crystal display panel according to claim 1, wherein all the main photo spacers within the rectangular pixel array except those at four vertexes of the rectangular pixel array are two arranged on a diagonal line extending from one corner of the rectangular pixel array to an opposite corner of the rectangular pixel array.

18. The liquid crystal display panel according to claim 1, wherein all the main photo spacers within the rectangular pixel array except those at four vertexes of the rectangular pixel array are three arranged on a diagonal line extending from one corner of the rectangular pixel array to an opposite corner of the rectangular pixel array.

\* \* \* \* \*